J. BOUVET.

Fruit Can.

No. 1,804. Reissued Nov. 1, 1864.

Witnesses:

Reynaud

A. Hoad

Inventor:

Jean Bouvet

UNITED STATES PATENT OFFICE.

MORITZ PINNER, OF NEW YORK, N. Y., ASSIGNEE OF JEAN BOUVET.

IMPROVEMENT IN METAL CANS, CASES, BOXES, &c., FOR PRESERVING FOOD, PAINTS, OILS, AND OTHER SUBSTANCES.

Specification forming part of Letters Patent No. 43,378, dated June 28, 1864; Reissue No. 1,804, dated November 1, 1864.

*To all whom it may concern:*

Be it known that JEAN BOUVET, of La Rochelle, in the Empire of France, has invented a new and useful mode of closing or sealing metal cans, cases, boxes, &c., designed for preserving food, gunpowder, liquids, paints, oils, and other articles, of which the following is a full and exact description, reference being had to the accompanying drawings, making part of this specification, and in which like letters denote like parts in all the figures.

Figure 2:
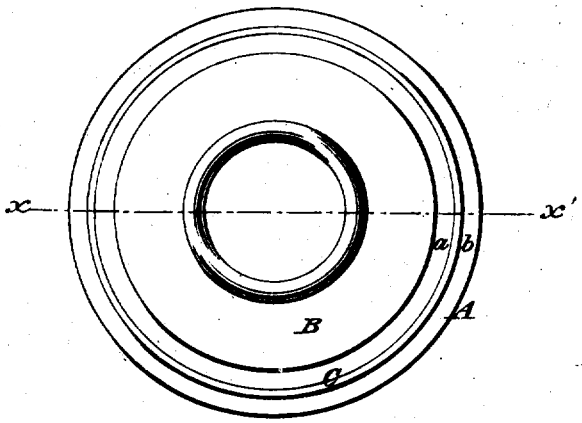
Figure 3:
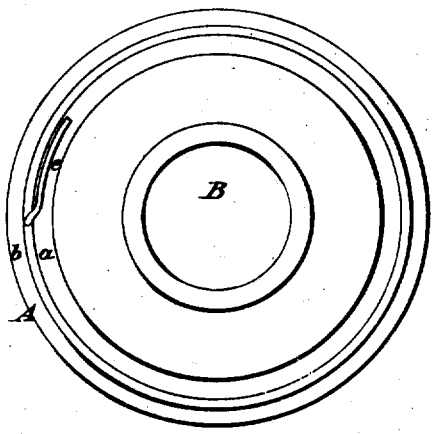
Figure 1:
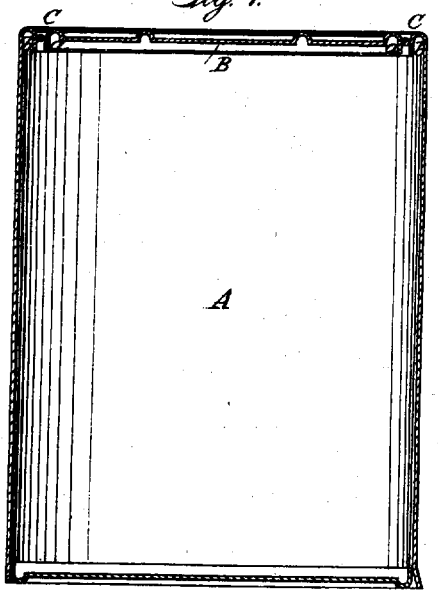
Figure 4:
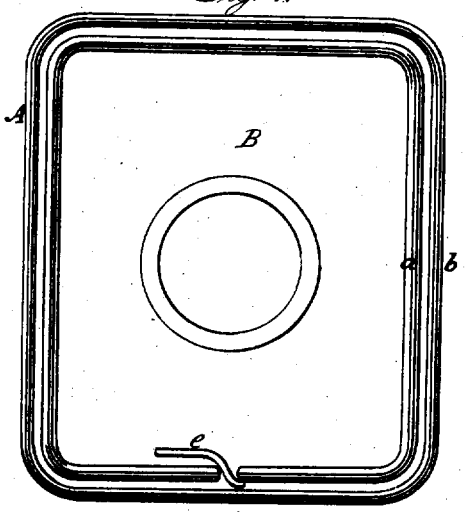

Figure 1 shows a longitudinal section in the line *x x'* of Fig. 2 of a tin preserve-box of a round shape. Fig. 2 shows a plan view of the inside of the top of such a box. Fig. 3 is a similar view of the outside. Fig. 4 represents an outside top view of a square tin box of the shape generally made use of for preserving sardines.

The object of the said invention of the said JEAN BOUVET is to present a mode of sealing tin preserve cans, boxes, and other similar metallic vessels, which, while offering a perfect hermetical sealing of such can, box, or other vessel, at the same time allows a ready and easy opening of the same when required, without being obliged to resort for this purpose to the aid of a knife or other cutting-tool or to the heating of the solder, and without injuring either the body or lid of the can, box, or other vessel, so that either or both of these parts may be used again. For this purpose the body of the can, box, or other vessel being manufactured in the ordinary manner by any of the known or any other suitable means, the upper edge of the same is bent around toward the inside, as shown at *b*. The lid B is formed in a suitable manner, as shown at *a*.

C represents a wire made of tinned iron or other suitable metal, in any desirable shape, but of a size to fit into the vacant space left between the parts *a* and *b*, where it is to be secured by means of solder or by soldering, so as to connect the parts *a* and *b* by a hermetical sealing. The wire, for which it is preferable to take tinned iron wire, may be of round, square, flat, or any other suitable shape to fit the space which is to be closed by it, but of such length as to have one of its ends, *e*, free or protrude beyond the lid B or other part of the can, box, or vessel, which is to be opened. When the can, box, or vessel is to be opened, this free end *e* of the wire or its equivalent is taken hold of by a pair of pinchers, a key, or any other contrivance operating in the same manner, and is thereupon turned in such a manner as to coil the free end *e* around the pinchers, key, or similar contrivance. This turning, coiling, or pulling of the free end *e* breaks or tears the solder or its equivalent, with which the can, box, or vessel is sealed, and thus the desired opening is finally effected. This operation of turning the pinchers, key, or like contrivance while coiling or pulling the protruding end *e* requires but a very moderate force. It soon starts, tears, or breaks the solder, and the can, box, or other vessel is not only opened, but is opened in such a manner as to leave the parts thereof uninjured and fit for reuse.

When the can, box, or other vessel is made in the form shown in the drawings, or any other form substantially the same and aiming at the same result, the arrangement of the parts for effecting the opening may be made and put together either before or after filling the vessel, as may be deemed most convenient. Where it is desirable to remove the entire top or bottom, as in sardine-boxes and some other cans or vessels, it is best to have the wire C placed near the rim of the top or bottom, as shown in the drawings; but where smaller openings will answer the purpose similar arrangement of parts could be made in the top, bottom, or side of a can, &c. For convenience of inserting the wire, a block of the same cross-section as the can, &c., may be used, by inserting it into the body of the can, box, or other vessel, and by placing thereon and soldering together the lid B and the wire C. In that case the other end of the can or box is not closed until after it has received the substance which is to be preserved or sealed up. The closing or sealing is then effected in the manner well known to tinners.

Cans, boxes, or other vessels closed on the principle of this invention are as secure as those closed in the usual modes, and may be submitted to the same amount of boiling-heat and handling as others, and have the advantage of much greater convenience of opening and also of saving the cans, boxes, &c., after opening them. It will easily be perceived that the principle embodied in this invention is applicable not only to tin cans, boxes, &c., designed for the preservation of food and liquids, but also to metallic and partly-metallic vessels for containing gunpowder, oils, paints, chemicals, books, and the many other articles for which, while in store or transit, metal cans, cases, boxes, or other vessels hermetically sealed, are generally used for the purpose of preservation and protection against the elements.

In conclusion, it is to be observed that the invention of the said JEAN BOUVET is not confined or restricted to the precise details of the arrangement above described, as many variations may be made therefrom without deviating from the main feature of the invention, which consists in constructing hermetically-sealed tin cans, cases, boxes, and other vessels in such a manner that the hermetical sealing may be broken and the can, &c., opened when required, in the manner above described; in inserting in the top or other convenient part of the can or other vessel to be opened a projection, *e*, for the purpose of starting the opening, and in inserting or soldering in any convenient part of a can or other vessel a wire, C, or its equivalent, in such a manner that it will close or seal such can or other vessel and so that by tearing out such wire or its equivalent in the manner described the can or vessel is opened without the necessity of using a knife or other cutting-tool; nor is this invention restricted to the shape or size of the cans, boxes, or other vessels, nor to the shape or metal of the wire C, which is to be detached or torn out of the solder during the operation of opening, or to the length or form of the protruding end *e*, which is to be used for starting the opening; nor is it restricted to the nature of the materials to be preserved in the said cans, boxes, or other vessels; but

What is claimed as the invention of the said JEAN BOUVET, and is desired to be secured by Letters Patent, is—

1. The manufacture and use of metal boxes, cans, cases, and other vessels hermetically sealed or closed substantially in the manner herein described, so that they may be opened by means of a pair of pinchers, a key, or other like contrivance operating in the same way, without the necessity of cutting the can or cover, as set forth.

2. The free end *e* of the wire C, or of its equivalent operating in the same way, in combination with the top, cap, or any other part of a hermetically-sealed can, box, or other vessel, for the purpose of starting the opening of such can, box, or other vessel when required.

3. Inserting or soldering in the top of a preserve can or box, or in any other part of such can or box, or in any other hermetically-sealed vessel in which an opening is to be made, a wire, C, or its equivalent, of any suitable shape and length, with a protruding part, *e*, so that such box, can, or other vessel may be opened in the manner substantially as herein set forth and described.

MORITZ PINNER.

Witnesses:
LEOPOLD MILLER,
M. FRIEND.